Figure 1:
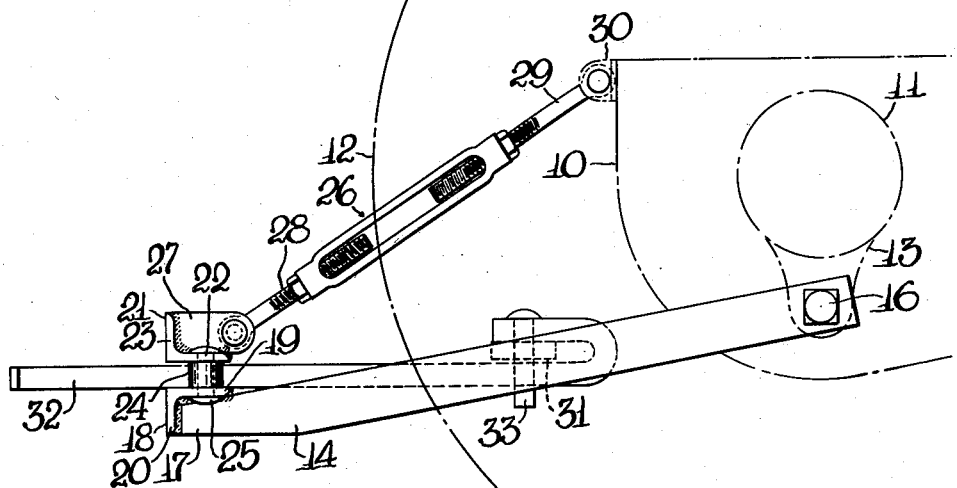

May 30, 1939.      W. O. BECHMAN      2,160,350
DRAWBAR
Filed March 12, 1938

Inventor
William O. Bechman
By V. F. Lassagne Att'y.

Patented May 30, 1939

2,160,350

UNITED STATES PATENT OFFICE 2,160,350

DRAWBAR

William O. Bechman, Chicago, Ill., assignor to International Harvester Company, a corporation of New Jersey Application March 12, 1938, Serial No. 195,530

7 Claims. (Cl. 280—33.44)

This invention relates to a draw-bar and particularly to a draw-bar in which the various elements are secured together by welding.

Draw-bar constructions of the light weight type have heretofore involved various faults of construction that resulted in premature fatigue of certain parts. These draw-bars, of the so-called one-piece type, included a U-shaped member, parts of which were in vertical planes, and another part of which was in a horizontal plane. To provide for this form of the U member, it was necessary that the legs thereof be twisted in order to provide for their attachment to a vehicle. These draw-bars were subject to breakage at these twisted points. Besides this disadvantage, these draw-bars entail certain manufacturing problems.

The principal object of the present invention, then, is to provide an improved draw-bar that is easily and readily manufactured, and which incorporates features of design that insure a draw-bar construction of unusual strength and rigidity.

An important object is to provide a draw-bar structure containing parts especially formed in a manner conducive to assembly by welding.

Another object is to arrange the parts in a manner eliminating premature fatigue and breakage of the construction.

Another object is to provide a draw-bar having a draft member which is permitted to swing laterally between wide limits.

Another object is to provide for improved means on the draw-bar for adjustably connecting the draw-bar to a vehicle.

Still another object is to arrange the parts of the draw-bar construction in a manner providing for proper disposition of the draft member with respect to the line of draft.

Figure 2:
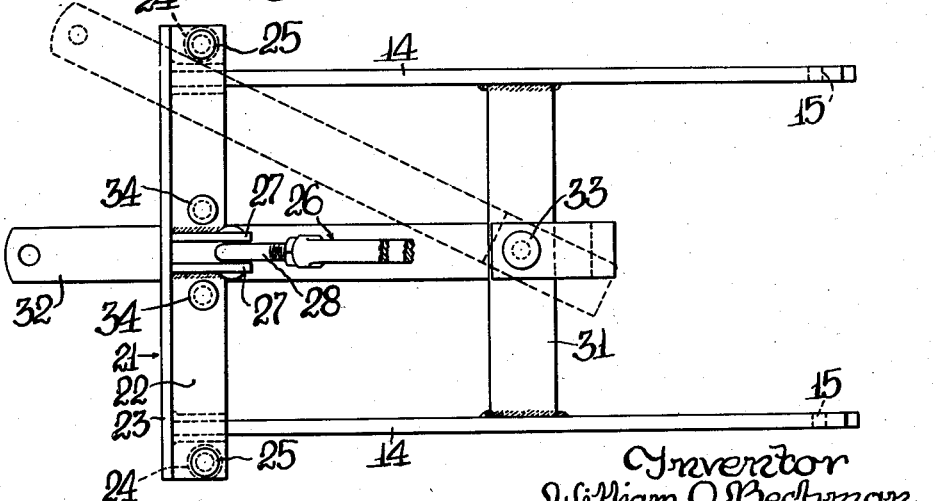

Briefly and specifically, these and other objects are achieved by providing a draw-bar construction having a pair of longitudinally extending spaced side frame members, each of which has a width substantially greater than its thickness. Each member is disposed with its width in a vertical plane and is attached at one end to a portion of a vehicle. The opposite ends of each of the members are welded to right angled flanges of a transverse member. The flanges of this member provide desirable welding surfaces as correlated with the upper and rear edges of the side members. A second transverse member is rigidly carried by the first transverse member in spaced relation thereabove. A draft member is movably associated with the side members and extends longitudinally between the two transverse members, being permitted to swing laterally between the limits established by the means securing the transverse members together. A further understanding of the objects and desirable features of the invention may be had from the following detailed description taken in conjunction with the accompanying sheet of drawing, in which:

Figure 1 is a side elevational view of the improved draw-bar construction, showing it in place on one type of vehicle; and, Figure 2 is a plan view of the draw-bar construction.

While the draw-bar construction is adapted for use in connection with any type of vehicle, it is shown and described in connection with a tractor. This tractor may be of any general construction and includes, as shown diagrammatically in Figure 1, a main body portion 10 having axle housings 11 supported on ground wheels 12. Each axle housing 11, only one of which is shown, has a depending portion or attaching ear 13, to which the draw-bar construction may be connected.

As previously referred to, the draw-bar includes a pair of rearwardly and longitudinally extending, spaced side members 14. Each member is provided at its forward end with an opening 15, through which a bolt 16 is passed to secure each member to each attaching ear 13 on each axle housing 11. The side members 14 are inclined normally rearwardly and downwardly and are reduced at their rear ends, as at 17.

A transverse member or angle bar 18 is disposed across the rear ends of the side members and includes a horizontal flange 19 and a vertical flange 20. As best shown in Figure 1, the horizontal flange 19 is welded to the upper edge or surface of each side member portion 17, and the vertical flange 20 is welded to the rear edge or surface of each portion 17. In this manner, the construction provides unusual strength and rigidity at those points.

A second transverse member, preferably formed as an angle bar 21, is rigidly carried by the angle bar 18 in spaced relation thereabove. This second transverse member has a horizontal flange 22 and a vertical flange 23. It will be noted that the horizontal flange 22 is in alinement with and spaced above the horizontal flange 19 of the member 18. A pair of spacing members or spools 24 are disposed between opposite ends of the transverse members 18 and 21, and securing means in the form of rivets 25 are passed there-through to secure the members together in spaced relation.

To provide for adjustably securing the draw-bar construction to the vehicle and to maintain the normally inclined position of the side members 14, there is provided an adjustable securing means 26. This means includes a pair of spaced members or plates 27 welded to the upper transverse member 21. The members 27 are welded to the upper face of the horizontal flange 22 and to the forward face of the vertical flange 23. This manner of welding, like the welded connection between the side members 14 and the first or lower transverse member 18, combines simplicity with unusual strength. The adjustable attaching means 26 further includes a turnbuckle threaded at opposite ends to threaded eye bolts 28 and 29. The eye bolt 28 is pivotally connected to the members 27, and the eye bolt 29 is pivotally connected to an attaching portion or ear 30 rigidly carried by the main body 10 of the tractor.

It will be noted that the side members 14 are of widths considerably greater than their thicknesses, and each member is disposed with its width lying in a vertical, longitudinally extending plane. This disposition of the members insures against premature breakage at points throughout their lengths.

A transverse member or support 31 is welded at opposite ends to the side members 14 at points intermediate the ends of the side members. A draft member 32 is movably associated with the side members 14 by being pivotally attached, as at 33, to a center portion of the support 31. This draft member is provided with a turned or bent-over portion, which is hooked over the support 31 from the forward side thereof, and the straight portion of the member extends rearwardly between the transverse members 18 and 21. Vertical movement of the draft member is limited by the transverse members and lateral swinging movement is permitted between wide limits, these limits being established by the spacing members or spools 24. If it is desired to further limit the lateral movement of the draft member 32, means in the form of pins 34 may be utilized. As shown in Figure 2, a pin 34 is passed through the transverse members at each side of the draft member 32 and the member is retained in a straight rearwardly extending position.

It will be noted from an examination of Figure 1 that the support 31 is disposed below a horizontal plane passed through the point of connection between the draw-bar and the tractor. It will be further noted that the rearward horizontal extension of the draft member 32 is in a horizontal plane below the aforesaid plane. In this manner, the draft member is properly disposed with respect to the line of draft. This provision is accomplished by the normally inclined position of the side members 14, which disposes the spaced transverse members 18 and 21 in a horizontal plane below the points of connection between the draw-bar and the vehicle.

From the foregoing description, it will be seen that a simple and improved type of draw-bar has been provided, the parts of which are arranged in a manner lending toward utmost strength and ease of manufacture. The disposition of the elements, as described, insures against premature fatigue and breakage of the various parts, and arrangement is made for the proper disposition of the draft member with respect to the line of draft. While only a preferred embodiment of the invention has been disclosed, it is obvious that numerous alterations and modifications may be made in the construction and in the manner of securing elements together without departing from the spirit and scope of the invention as defined in the appended claims.

What is claimed is:

1. A vehicle draw-bar comprising a pair of substantially straight, longitudinally running side members, the width of each being substantially greater than its thickness and each being disposed with said width in a vertical plane, each member being adapted at its forward end for connection to the vehicle, a transverse member disposed across the rear ends of the side members and having a forwardly extending horizontal portion and a downwardly extending vertical portion, said portions being welded to the upper edge and to the rear edge respectively of each side member, a second transverse member welded to the side members forwardly of the first transverse member, and a draft member connected to said second transverse member and extending rearwardly over and beyond the first transverse member.

2. A vehicle draw-bar comprising a pair of straight, longitudinally running side members, the width of each being substantially greater than its thickness and each being disposed with said width in a vertical plane, each member being adapted at its forward end for connection to the vehicle, a transverse member disposed across the rear ends of the side member and having a forwardly extending horizontal portion and a downwardly extending vertical portion, said portions being welded to the upper edge and to the rear edge respectively of each side member, a second transverse member carried by and above the first transverse member in spaced relation thereto, a transverse support welded to the side members intermediate their ends, and a draft member pivotally connected to the support and extending rearwardly between and beyond the aforesaid transverse members.

3. A vehicle draw-bar comprising a pair of straight, longitudinally running side members, the width of each being substantially greater than its thickness and each being disposed with said width in a vertical plane, each member being adapted at its forward end for connection to the vehicle, a transverse member disposed across the rear ends of the side member and having a forwardly extending horizontal portion and a downwardly extending vertical portion, said portions being welded to the upper edge and to the rear edge respectively of each side member, a second member carried by and above the first transverse member in spaced relation thereto, a transverse support welded to the side members intermediate their ends said support being disposed substantially in a horizontal plane passed below the second transverse member and the points of connection at the forward ends of the side members, and a draft member pivotally connected to the support and extending rearwardly substantially in the aforesaid plane between and beyond the transverse members.

4. A vehicle draw-bar comprising a pair of straight, longitudinally running side members, the width of each being substantially greater than its thickness and each being disposed with said width in a vertical plane, each member being adapted at its forward end for connection to the vehicle, a transverse member disposed across the rear ends of the side members and having a forwardly extending horizontal portion and a downwardly extending vertical portion, said portions being welded to the upper edge and to the rear edge respectively of each side member, a second transverse member disposed across the rear ends of the side members, said member having a horizontal portion and an upwardly extending vertical portion, the member being secured at its horizontal portion in spaced relation above the first transverse member, means carried by the second transverse member and adapted to be connected to the vehicle, said means including a portion welded to both the vertical and horizontal portions of the second transverse member, a support welded to the side members intermediate their ends, and a draft member pivotally carried by the support and extending rearwardly between and beyond the transverse members.

5. A vehicle draw-bar comprising a frame structure and a draft member, said frame structure including a pair of laterally spaced, parallel side members, each adapted at one end for connection to the vehicle and extending longitudinally rearwardly therefrom, a pair of transverse members disposed across the rear ends of the side members, each transverse member including a horizontal and a vertical flange, said members being rigidly secured together with their horizontal flanges opposed and in spaced relation, the two flanges of one member overlying two surfaces of each side member and being welded thereto at said surfaces, the aforesaid draft member being movably associated with the side members and extending rearwardly between the horizontal flanges of the transverse members.

6. A vehicle draw-bar comprising a pair of laterally spaced side members, each adapted at one end for connection to the vehicle and extending rearwardly therefrom, a transverse member including a horizontal flange and a vertical flange disposed across the rear ends of the side members, the forward surface of the vertical flange being welded to the rear edge of each side member and the lower surface of the horizontal flange being welded to the upper edge of each side member, a second transverse member disposed above the first transverse member, and a pair of spacing members rigidly securing said transverse members together, each spacing member being located laterally outwardly of a respective side member, and a draft member movably associated with the side members intermediate their ends and extending rearwardly between the transverse members, said draft member being laterally movable within the limits of the aforesaid spacing members.

7. A vehicle draw-bar comprising a pair of spaced, longitudinally extending side members, each being adapted at one end for connection to the vehicle and each lying throughout its length in one plane, a transverse member disposed across the other ends of the side members and having a horizontal portion and a vertical portion, said portions being welded to a horizontal surface and to a vertical surface respectively of each side member, a second transverse member secured to the first transverse member in spaced relation thereto, and a draft member movably associated with the side members intermediate their ends and extending between said transverse members.

WILLIAM O. BECHMAN.